United States Patent
Montero et al.

(10) Patent No.: US 7,380,148 B2
(45) Date of Patent: May 27, 2008

(54) SYSTEM AND METHOD FOR INFORMATION HANDLING SYSTEM MULTIMEDIA MODE BOOT OPTIMIZATION

(75) Inventors: Adolfo S. Montero, Austin, TX (US); Muhammed K. Jaber, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 530 days.

(21) Appl. No.: 10/782,160

(22) Filed: Feb. 19, 2004

(65) Prior Publication Data
US 2005/0204181 A1 Sep. 15, 2005

(51) Int. Cl.
*G06F 1/32* (2006.01)
(52) U.S. Cl. ...................... 713/324; 713/323
(58) Field of Classification Search ............... 713/323, 713/324
See application file for complete search history.

(56) References Cited

U.S. PATENT DOCUMENTS

| | | | |
|---|---|---|---|
| 6,297,794 B1 | 10/2001 | Tsubouchi et al. | 345/112 |
| 6,704,811 B2 * | 3/2004 | Jacobs et al. | 710/14 |
| 6,839,836 B2 * | 1/2005 | Cole et al. | 713/2 |
| 2002/0010007 A1 | 1/2002 | Goodings et al. | 455/566 |
| 2004/0006690 A1 * | 1/2004 | Du et al. | 713/2 |
| 2004/0019811 A1 * | 1/2004 | Tung | 713/300 |
| 2005/0055545 A1 * | 3/2005 | Guo et al. | 713/1 |

\* cited by examiner

*Primary Examiner*—Thuan Du
(74) *Attorney, Agent, or Firm*—Hamilton & Terrile, LLP; Robert W. Holland

(57) ABSTRACT

An information handling system selectively boots to a normal operation mode having devices and applications configured to operate normally or a multimedia operation mode having devices and applications that support presentation of multimedia information enabled and other devices and applications disabled. In one embodiment, the multimedia mode improves portable information handling system multimedia performance by reducing power consumption to improve battery charge life and by reducing boot time to improve the timeliness of the user experience. For instance, a multimedia module interfaces with the operating system to disable power up of non-multimedia devices, such as networking devices, and non-multimedia applications, such as antivirus applications, while enabling multimedia devices, such as a DVD disc drive, to display multimedia information, such as a DVD movie.

15 Claims, 2 Drawing Sheets

SYSTEM AND METHOD FOR INFORMATION HANDLING SYSTEM MULTIMEDIA MODE BOOT OPTIMIZATION

BACKGROUND OF THE INVENTION

1. Field of the Invention

The present invention relates in general to the field of information handling system operating system boot, and more particularly to a system and method for information handling system multimedia mode boot optimization.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An increasingly common use of information handling systems, particularly portable systems, is for the display of multimedia information, such as presentations and videos. For instance, portable information handling systems are often used by business people to display presentations to groups through a projector with presentations such as Powerpoint. As another example, portable information handling systems are often used for entertainment by the playing of DVD movies with a DVD drive device. Generally in order to use an information handling system to display multimedia information, the operating system of the information handling system brings all devices to an operational status and maintains all devices in the operational status whether or not a particular device supports the display of multimedia information. For instance, while a user plays a DVD movie on an information handling system disc drive, the operating system typically maintains networking devices and antivirus applications operational even though these devices and applications are not needed to play the DVD movie. Unused but enabled devices and applications waste CPU cycles, such as by unnecessary scans for a network, so that, under some circumstances the presentation of the multimedia information is unnecessarily and adversely impacted.

A difficulty that often arises with the presentation of multimedia information through a portable information handling system is that the internal battery charge expires prematurely, such as in the middle of a lengthy DVD movie. Another difficulty that arises is that presentation of the multimedia information is delayed by the normal boot process that the operating system uses to bring all of the processing components and automatically initiated programs to a normal operational state. Although portable information handling systems have modes of operation that reduce power consumption to preserve battery life, such as shutting down the display or otherwise hibernating, those modes of operation typically do not take effect while the information handling system is in active use, such as during presentation of multimedia information. Some specialized systems have been developed to provide "instant on" for playing DVD movie or CD audio information with reduced start-up time and battery consumption. However, such specialized systems typically incorporate a unique custom player with an independent operating system, such as in the BIOS, custom hardware or a separate hard disc drive partition. The use of custom hardware and software processing components increases system design and manufacture cost.

SUMMARY OF THE INVENTION

Therefore a need has arisen for a system and method which leverages multimedia capabilities available in an information handling system normal operation mode with reduced power consumption and start-up time.

In accordance with the present invention, a system and method are provided which substantially reduce the disadvantages and problems associated with previous methods and systems for presenting multimedia information at an information handling system. Information handling system processing components selectively boot to a multimedia mode having multimedia processing components enabled to support presentation of multimedia information and non-multimedia processing components disabled to reduce power consumption and boot time.

More specifically, an information handling system having plural processing components managed in normal operation by an operating system includes a multimedia selector switch, such as an alternative power switch, that boots the information handling system to a multimedia mode. A multimedia module applies a modified boot that enables substantially only those processing components that support a desired multimedia application and leaves the remaining processing components disabled. For instance, to play a DVD movie in a disc drive, the multimedia module commands a multimedia boot of the operating system to enable devices, such as the CPU, memory, video, audio and input devices, and applications, such a movie player, that support display of the movie. The multimedia module commands the multimedia boot to not enable devices, such as network interface cards (NIC), wireless interfaces, modems, communication ports and unused buses, and applications, such as antivirus software, that do not support display of the movie. In addition, the multimedia module bypasses boot procedures not needed to operate the multimedia application, such as the POST tests, and restricts processing power consumption to a level that is sufficient to support display of multimedia information, such as throttling CPU cycles to a lower level after boot is complete.

The present invention provides a number of important technical advantages. One example of an important technical advantage is that information handling system boot time and power consumption are reduced in a multimedia operating mode compared with a normal operating mode. Boot time is reduced since the operating system does not have to start up drivers for unused devices, does not have to perform unneeded systems tests and does not have to initiate unneeded applications or connect to networks. Power consumption is reduced since fewer devices receive power and less computing cycles are necessary. The reduced boot time and reduced power consumption improve the user experience with a more instant-on perception and greater multimedia presentation endurance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system boot to a multimedia operating mode supports presentation of multimedia information with reduced boot time and power consumption compared to a normal operating mode by selectively enabling multimedia processing components and disabling non-multimedia processing components. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
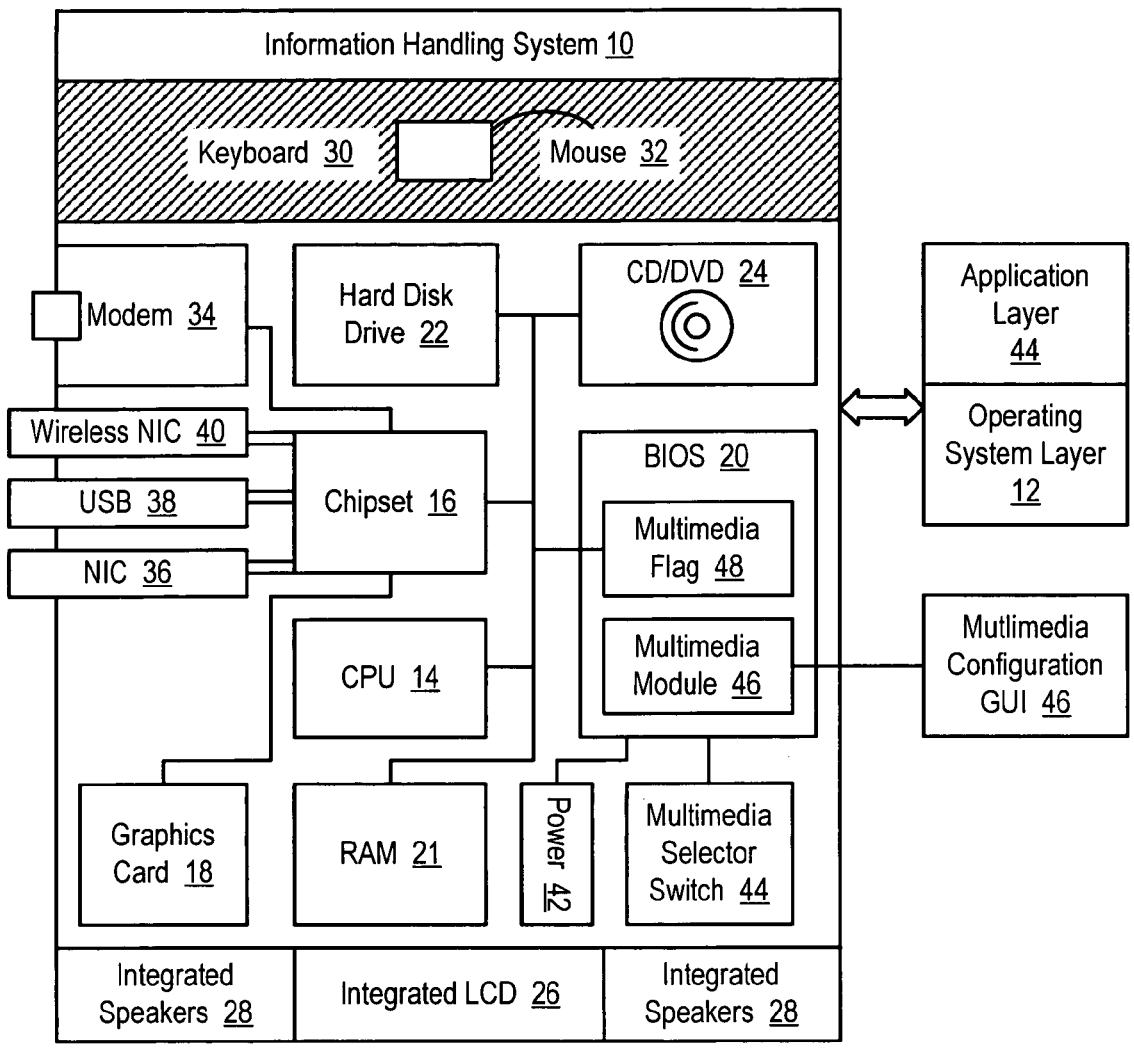
FIG. 1 depicts a block diagram of an information handling system configured to support boot to a multimedia mode.

Referring now to FIG. 1, a block diagram depicts an information handling system 10 configured to support boot to a multimedia mode. Information handling system 10 processes information with a number of processing components managed by an operating system 12, such as a CPU 14, chipset 16, graphics card 18, BIOS 20, RAM 21, hard disc drive 22, CD/DVD disc drive 24, integrated LCD 26 and speakers 28, integrated keyboard 30 and mouse 32, modem 34, NIC 36, USB interface 38 and wireless NIC 40. To initiate normal operations, a user selects a power switch 42 that inputs the user request for a normal boot to BIOS 20. BIOS 20 includes firmware instructions to perform basis systems tests, such as POST tests, power up the devices, including hard disc drive 22, and load operating system 12 into RAM 21 for use by CPU 14. Operating system 12 executes boot instructions to start up drivers for configured devices, identify and configure unknown devices, connect to a network and initiate desired applications 44, such as antivirus software. Once operating system 12 completes boot of the processing components to a normal operational state, it monitors devices for failures or difficulties, periodically scans for unknown devices, initiates and maintains any network connections, and performs other housekeeping functions.

In order to provide a system boot that is better optimized for presentation of multimedia information, a multimedia selector switch 44 is disposed on information handling system 10 to accept a user request for boot to a multimedia mode. Multimedia selector switch 44 is selectable between normal and multimedia positions that control the input of power switch 42 or offers a separate power switch for initiation of a multimedia mode. Alternatively, multimedia selector switch may be configured as a displayed selection on LCD 26 or an automated selection integrated with one or more audio or video devices, such as an automated selector initiated by insertion of a DVD into CD/DVD drive 24.

Selection of a multimedia mode is communicated to a multi-media module 46 interfaced with multimedia selector switch 44. Multimedia module 46 sets a multimedia flag 48 that alerts CPU 14 to the multimedia mode boot selection and also defines the processing components enabled by the multimedia boot of operating system 12. The multimedia devices enabled in a multimedia boot are substantially only predetermined processing components that support a desired multimedia application. Examples of devices enabled in a multimedia boot include the information handling system CPU, memory, video, audio and input devices plus inconsequential devices that have a minimal impact on power and boot time constraints. The video and audio devices might include a DVD drive, LCD and speakers to support display of a DVD movie with a movie player application. Examples of devices that are not enabled include NICs, wireless interfaces, Cardbus, IrdA, soft modems, 1394 ports, communication ports and USB. A multimedia configuration graphical user interface 46 supports selection of various configurations achieved by a multimedia boot. For instance, a configuration that plays DVD movies may disable the USB while a configuration that plays a presentation for a projector may enable the USB to communicate the presentation information to the projector.

In addition to selecting devices for boot to a multimedia mode, multimedia module 46 manages the boot to optimizes system performance. For instance, POST tests are bypassed to reduce boot time and CPU clock speed is managed to have a high performance setting during boot to reduce boot time followed by a throttling to a reduced performance setting to reduce power consumption. Multimedia module 46 shuts down non-multimedia devices with power control at BIOS 20 to hide them from discovery by operating system 12, which may otherwise attempt to power up unused devices. Multimedia module 46 re-orders and omits boot actions by operating system 12, such as powering up a DVD drive substantially simultaneously with a hard disc drive to reduce time until the DVD drive is ready, shutting down operating system functions like automated saves or searches for network connections, and preventing automated initialization of utility programs like antivirus applications. Although FIG. 1 depicts multimedia module 46 as module in BIOS 20, all or portions of the functions of multimedia module 46 may instead be accomplished as an operating system module or plug-in.

Figure 2:
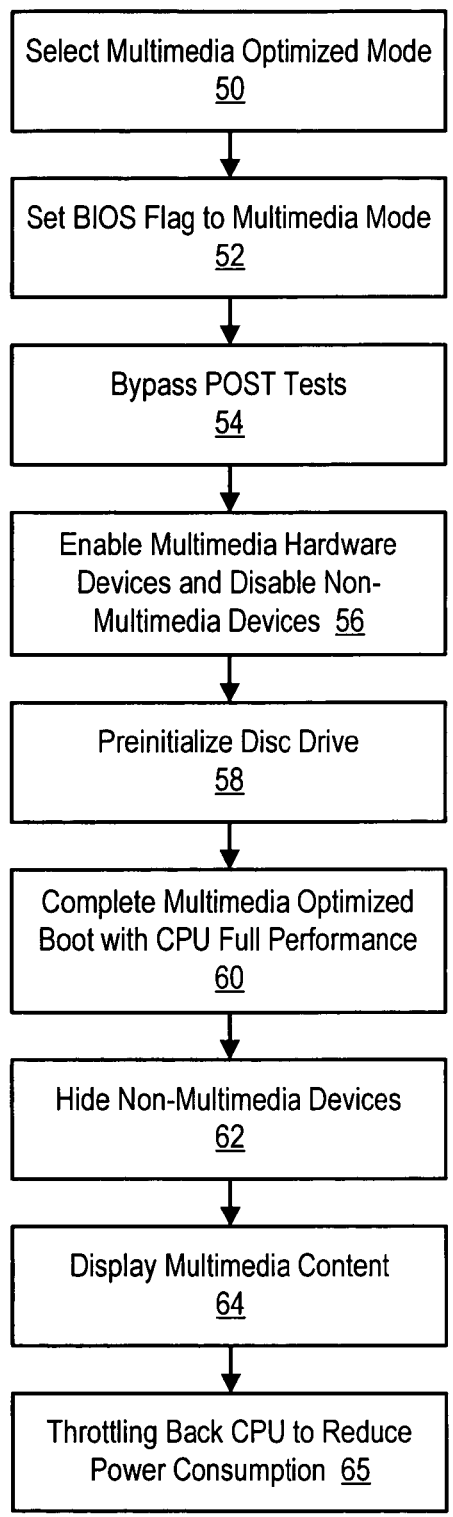
FIG. 2 depicts a flow diagram of a process for booting an information handling system to a multimedia mode.

Referring now to FIG. 2, a flow diagram depicts a process for booting an information handling system to a multimedia mode. At step 50, a user selects a multimedia optimized mode from either a normal or off state and thus initiates a multimedia boot. At step 52, the multimedia mode flag of the BIOS is set and, at step 54, the BIOS boot instructions to perform POST tests are bypassed. At step 56, multimedia hardware devices are enabled and non-multimedia devices are disabled in accordance with a predetermined list of devices that are selectable or preset. At step 58, the disc drive is preinitialized to reduce the time needed to bring it to an operational status and, at step 60, the operating system boot of drivers and applications is performed with the CPU operating at full speed. At step 62, non-multimedia devices are hidden from the operating system to prevent their inadvertent activation. At step 64, desired multimedia information is displayed with an appropriate multimedia application. At step 65, upon completion of the multimedia boot the CPU performance is throttled back to a level sufficient to sustain unimpeded presentation of the multimedia information with reduced CPU cycles providing reduced power consumption. Upon completion of the presentation of multimedia information, whether a movie DVD, an audio CD or a visual presentation, the user reboots the information handling system to a normal mode for normal functionality.

Although the present invention has been described in detail, it should be understood that various changes, substitutions and alterations can be made hereto without departing from the spirit and scope of the invention as defined by the appended claims.

What is claimed is:

1. An information handling system having improved multimedia performance, the information handling system comprising:
    plural processing components operable to process information for presentation to a user;
    an operating system operable to coordinate operation of the processing components in a normal mode or a multimedia mode;
    a multimedia application operable to interface with predetermined of the processing components through the operating system to present multimedia information;
    a multimedia mode selector interfaced with one or more of the processing components and operable to accept a user selection of a multimedia mode of operation;
    a multimedia module interfaced with the multimedia mode selector and the operating system, the multimedia module operable to boot the processing components and operating system to the multimedia mode upon selection through the multimedia mode selector, the multimedia mode having substantially only the predetermined of the processing components configured to run in support of the multimedia application; and
    a power switch interfaced with the operating system and operable to accept a user selection of a normal mode of operation, the normal mode having the operating system boot substantially all of the processing components after a POST;
    wherein the multimedia module disables the POST for boots to the multimedia mode.

2. The information handling system of claim 1 wherein the predetermined of the processing components comprise a CPU, memory, video devices, audio devices and input devices.

3. The information handling system of claim 2 wherein the processing components excluded from boot by the multimedia module comprise a network interface card, a wireless network interface, and a modem.

4. The information handling system of claim 2 wherein the predetermined of the processing components further comprise a DVD disc drive and the multimedia application comprises a DVD movie player.

5. The information handling system of claim 4 wherein the predetermined processing components further comprise a hard disc drive storing the operating system and the multimedia module is further operable to initiate power to spin-up the DVD disc drive substantially simultaneous with initiation of power to the hard disc drive to boot the operating system.

6. The information handling system of claim 2 wherein the multimedia module is further operable to reduce CPU clock speed after boot of the predetermined processing components to an operational state.

7. The information handling system of claim 1 further comprising:
    one or more utility applications automatically initiated by the operating system;
    wherein the multimedia module is further operable to disable automatic initiation of the utility applications in the multimedia mode.

8. The information handling system of claim 7 wherein the utility applications comprise an antivirus application.

9. A method for booting an information handling system to a multimedia mode, the method comprising:
    selecting a multimedia mode to present multimedia information at the information handling system;
    modifying boot of the information handling system operating system to enable multimedia devices and disable non-multimedia devices, wherein modifying the boot comprises bypassing the POST otherwise automatically initiated by the BIOS; and
    running a multimedia application with the operating system and the multimedia devices to display multimedia information.

10. The method of claim 9 further comprising:
    disabling one or more non-multimedia applications that are otherwise automatically initiated by the operating system.

11. The method of claim 10 wherein the non-multimedia applications comprise an antivirus application.

12. The method of claim 9 wherein modifying boot of the information handling system further comprises:
    enabling the CPU, memory, video, audio, input and disc drive devices; and
    disabling the network interface card, wireless interface and modem devices.

13. The method of claim 12 wherein the multimedia information comprises a movie presented from a DVD disc.

14. The method of claim 9 further comprising:
    operating the CPU at full performance to complete the modified boot and the initiation of the presentation of multimedia information; and
    throttling the CPU performance to present the multimedia information with reduced power consumption.

15. A method for booting an information handling system to a multimedia mode, the method comprising:
    selecting a multimedia mode to present multimedia information at the information handling system;
    modifying boot of the information handling system operating system to enable multimedia devices and disable non-multimedia devices;
    running a multimedia application with the operating system and the multimedia devices to display multimedia information; and
    hiding non-multimedia devices from the operating system to prevent the operating system from trying to power-up unused devices.

* * * * *